United States Patent
Ueyoko et al.

(10) Patent No.: US 8,967,213 B2
(45) Date of Patent: Mar. 3, 2015

(54) AIRCRAFT TIRE

(71) Applicants: Kiyoshi Ueyoko, Copley, OH (US); Badal Das, Strongsville, OH (US)

(72) Inventors: Kiyoshi Ueyoko, Copley, OH (US); Badal Das, Strongsville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 129 days.

(21) Appl. No.: 13/716,665

(22) Filed: Dec. 17, 2012

(65) Prior Publication Data

US 2013/0139942 A1    Jun. 6, 2013

Related U.S. Application Data

(63) Continuation-in-part of application No. 12/860,119, filed on Aug. 20, 2010, now Pat. No. 8,578,988.

(51) Int. Cl.
*B60C 9/18*    (2006.01)
*B60C 9/26*    (2006.01)
*B60C 9/28*    (2006.01)

(52) U.S. Cl.
USPC ............ 152/526; 152/528; 152/535; 152/538

(58) Field of Classification Search
None
See application file for complete search history.

(56) References Cited

FOREIGN PATENT DOCUMENTS

JP    2006-224729    *    8/2006

OTHER PUBLICATIONS

Machine translation of JP 2006-224729, 2006.*

* cited by examiner

*Primary Examiner* — Justin Fischer
(74) *Attorney, Agent, or Firm* — June E. Rickey

(57) ABSTRACT

A pneumatic tire having a carcass and a belt reinforcing structure wherein the belt reinforcing structure is a composite belt structure having at least one radially inner spiral layer and at least one zigzag belt reinforcing structure located radially outward of said spiral layer. The zigzag belt width is preferably wider than the spiral layer.

24 Claims, 6 Drawing Sheets

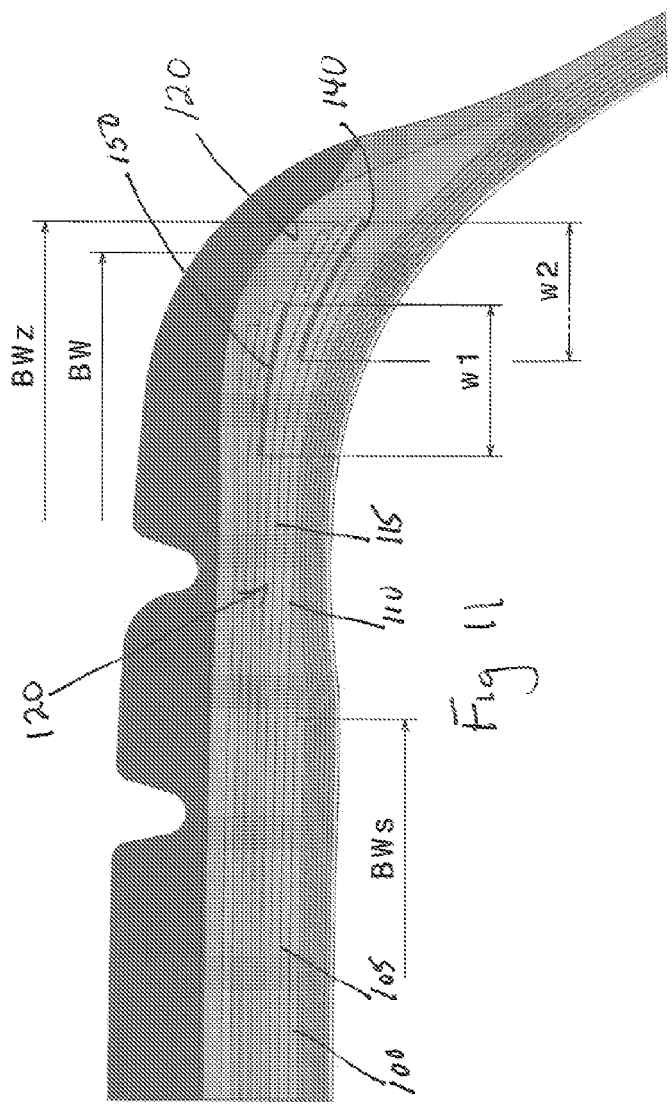
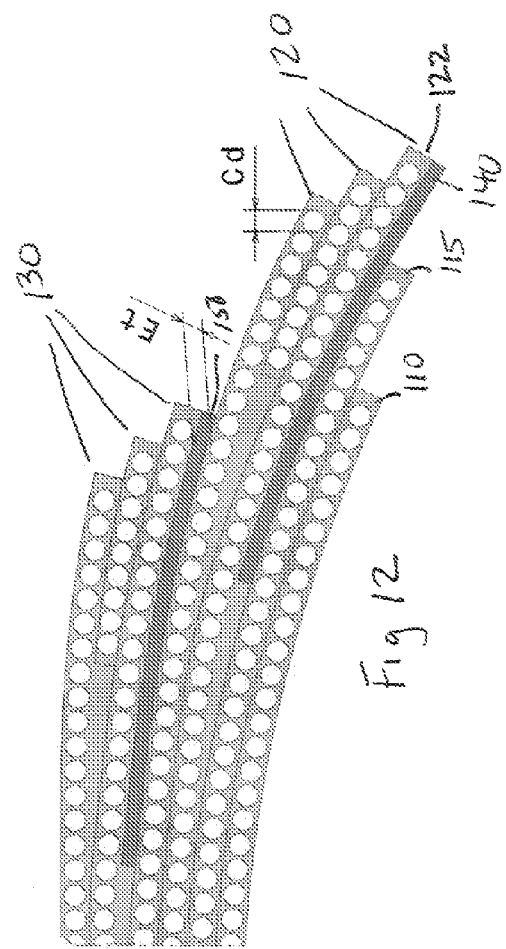

AIRCRAFT TIRE

FIELD OF THE INVENTION

This invention relates to pneumatic tires having a carcass and a belt reinforcing structure, more particularly to high speed heavy load tires such as those used on aircraft.

BACKGROUND OF THE INVENTION

Pneumatic tires for high speed applications experience a high degree of flexure in the crown area of the tire as the tire enters and leaves the area of the footprint. This problem is particularly exacerbated on aircraft tires wherein the tires can reach speed of over 200 mph at takeoff and landing.

When a tire spins at very high speeds the crown area tends to grow in dimension due to the high angular accelerations and velocity, tending to pull the tread area radially outwardly. Counteracting these forces is the load of the vehicle which is only supported in the small area of the tire known as the footprint area.

Current tire design drivers are an aircraft tire capable of high speed, high load and with reduced weight. It is known in the prior art to use zigzag belt layers in aircraft tires, such as disclosed in the Watanabe U.S. Pat. No. 5,427,167. Zigzag belt layers have the advantage of eliminating cut belt edges at the outer lateral edge of the belt package. The inherent flexibility of the zigzag belt layers also help improve cornering forces. However, a tire designed with zigzag belt layers cannot carry as heavy a load as required by current commercial aircraft design requirements. Further, there is generally a tradeoff between load capacity and weight. Thus an improved aircraft tire is needed, which is capable of meeting high speed, high load and with reduced weight.

DEFINITIONS

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Ply" means a continuous layer of rubber-coated parallel cords.

"Radial" and "radially" mean directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Zigzag belt reinforcing structure" means at least two layers of cords or a ribbon of parallel cords having 1 to 20 cords in each ribbon and laid up in an alternating pattern extending at an angle between 5° and 30° between lateral edges of the belt layers.

BRIEF DESCRIPTION OF THE DRAWINGS

FIG. 11 is an enlarged cross-sectional view of a ninth embodiment of a belt package.

FIG. 12 is a close up view of a section of the belt package of FIG. 11.

DETAILED DESCRIPTION OF THE INVENTION

Figure 1:
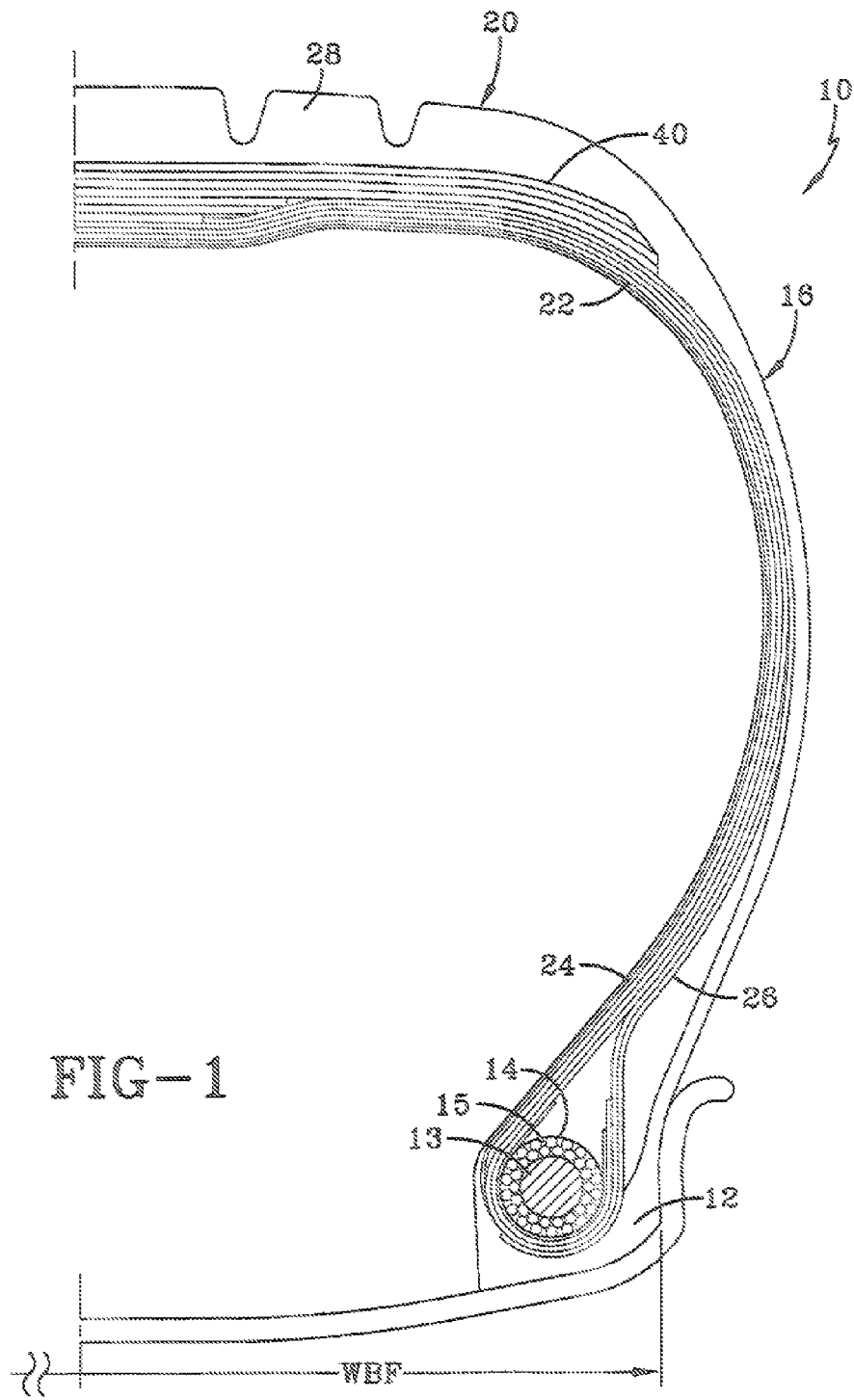
FIG. 1 is a schematic cross-sectional view of a first embodiment of half of a tire according to the invention.

FIG. 1 illustrates a cross-sectional view of one half of a radial aircraft tire 10 of the present invention. The tire is symmetrical about the mid-circumferential plane so that only one half is illustrated. As shown, the aircraft tire comprises a pair of bead portions 12 each containing a bead core 14 embedded therein. One example of a bead core suitable for use in an aircraft tire is shown in U.S. Pat. No. 6,571,847. The bead core 14 preferably has an aluminum, aluminum alloy or other light weight alloy in the center portion 13 surrounded by a plurality of steel sheath wires 15. A person skilled in the art may appreciate that other bead cores may also be utilized.

The aircraft tire further comprises a sidewall portion 16 extending substantially outward from each of the bead portions 12 in the radial direction of the tire, and a tread portion 20 extending between the radially outer ends of the sidewall portions 16. Furthermore, the tire 10 is reinforced with a carcass 22 toroidally extending from one of the bead portions 12 to the other bead portion 12. The carcass 22 is comprised of inner carcass plies 24 and outer carcass plies 26, preferably oriented in the radial direction. Among these carcass plies, typically four inner plies 24 are wound around the bead core 14 from inside of the tire toward outside thereof to form turnup portions, while typically two outer plies 26 are extended downward to the bead core 14 along the outside of the turnup portion of the inner carcass ply 24. Each of these carcass plies 24, 26 may comprise any suitable cord, typically nylon cords such as nylon-6,6 cords extending substantially perpendicular to an equatorial plane EP of the tire (i.e., extending in the radial direction of the tire). Preferably the nylon cords have an 1890 denier/2/2 or 1890 denier/3 construction. One or more of the carcass plies 24, 26 may also comprise an aramid and nylon cord structure, for example, a hybrid cord, a high energy cord or a merged cord. Examples of suitable cords are described in U.S. Pat. No. 4,893,665, U.S. Pat. No. 4,155,394 or U.S. Pat. No. 6,799,618.

Figure 3:
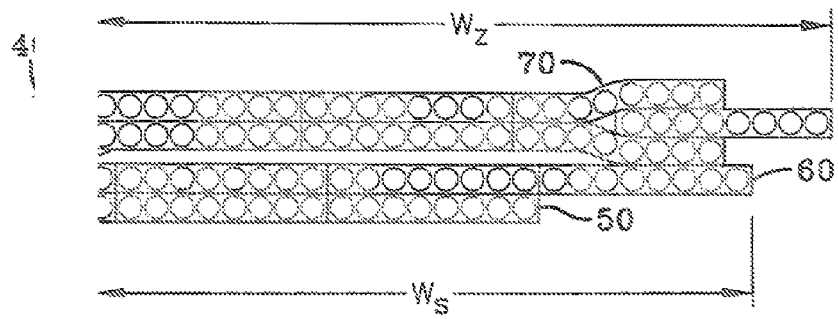
FIG. 3 is a schematically enlarged cross-sectional view of a first embodiment of half of a composite belt package for a tire showing the belt layer configuration.
Figure 4:
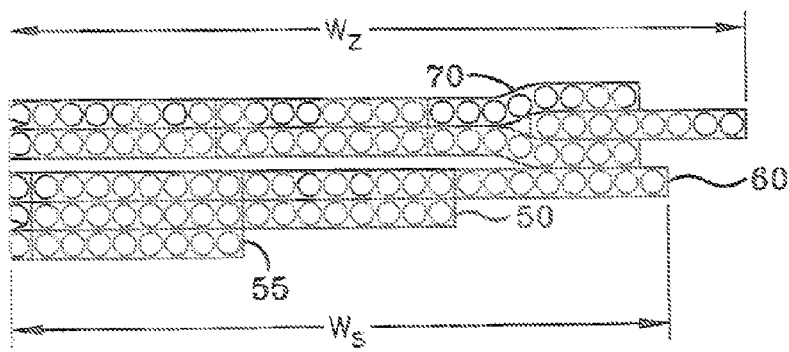
FIG. 4 is a schematically enlarged cross-sectional view of a second embodiment of a composite belt package showing the belt layer configuration.
Figure 5:
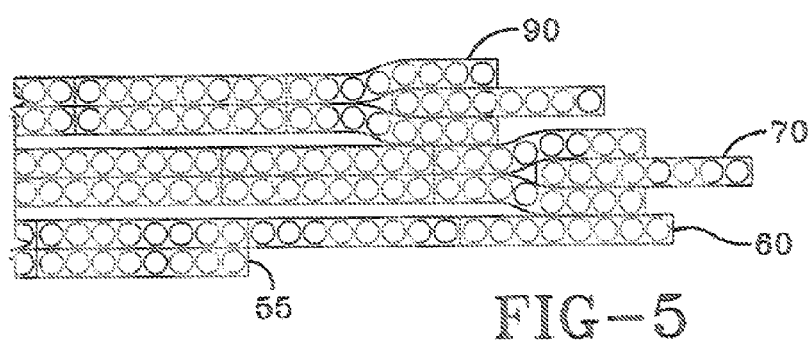
FIG. 5 is a schematically enlarged cross-sectional view of a third embodiment of a composite belt package showing the belt layer configuration.

The aircraft tire 10 further comprises a belt package 40 arranged between the carcass 22 and the tread rubber 20. FIG. 3 illustrates a first embodiment of one half of a belt package 40 suitable for use in the aircraft tire. The belt package 40 is symmetrical about the mid-circumferential plane so that only one half of the belt package is illustrated. The belt package 40 as shown comprises a first belt layer 50 located adjacent the carcass. The first belt layer 50 is preferably formed of cords having an angle of 5 degrees or less with respect to the mid-circumferential plane. Preferably, the first belt layer 50 is formed of a rubberized strip 43 of two or more cords made by spirally or helically winding the cords at an angle of plus or minus 5 degrees or less relative to the circumferential direction. The first belt layer 50 is the narrowest belt structure of the belt package 40, and has a width in the range of about 13% to about 100% of the rim width (width between flanges), and more particularly in the range of about 20% to about 70% of the rim width (width between flanges), and most particularly in the range of about 30% to about 42% of the rim width (width between flanges).

The belt package 40 further comprises a second belt layer 60 located radially outward of the first belt layer 50. The second belt layer 60 is preferably formed of cords having an angle of 5 degrees or less with respect to the mid-circumferential plane. Preferably, the second belt layer 60 is formed of a rubberized strip 43 of two or more cords made by spirally or helically winding the cords at an angle of plus or minus 5 degrees or less relative to the circumferential direction. The second belt layer has a width in the range of about 101% to about 120% of the rim width, and has a width greater than the first belt layer 50.

Figure 2:
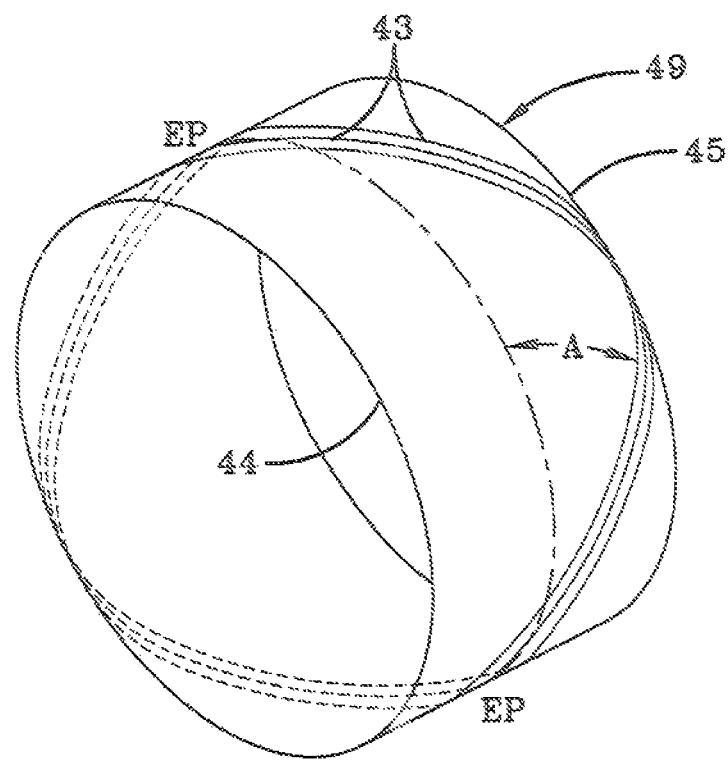
FIG. 2 is a schematic perspective view of a zigzag belt layer in the middle of the formation.

The belt package 40 further comprises at least one zigzag belt reinforcing structure 70. The zigzag belt reinforcing structure 70 is comprised of two layers of cord interwoven together formed as shown in FIG. 2. The zigzag belt structure is formed from a rubberized strip 43 of one or more cords 46, that is wound generally in the circumferential direction while being inclined to extend between alternating lateral edges 44 and 45 of a tire building drum 49 or core. The strip is wound along such zigzag path many times while the strip 43 is shifted a desired amount in the circumferential direction so as not to form a gap between the adjoining strips 43. As a result, the cords extend in the circumferential direction while changing the bending direction at a turnaround point at both ends 44, 45. The cords of the zigzag belt structure cross with each other, typically at a cord angle A of 5 degrees to 30 degrees with respect to the equatorial plane EP of the tire when the strip 43 is reciprocated at least once between both side ends 44 and 45 of the ply within every 360 degrees of the circumference as mentioned above. The two layers of cords formed in each zigzag belt structure are embedded and inseparable in the belt layer and wherein there are no cut ends at the outer lateral ends of the belt.

It is preferred that the zigzag belt structure 70 is the most radially outward belt structure of the belt package 40. It is additionally preferred that there is only one zigzag belt structure. The zigzag belt structure 70 is preferably wider than the first belt structure, and more preferably is wider than both the first belt structure and the second belt structure 60. The ratio of the zigzag belt width Wz to the second belt structure 60 width Ws is preferably as follows:

$$0.6 < Ws/Wz < 1 \tag{1}$$

Figure 6:
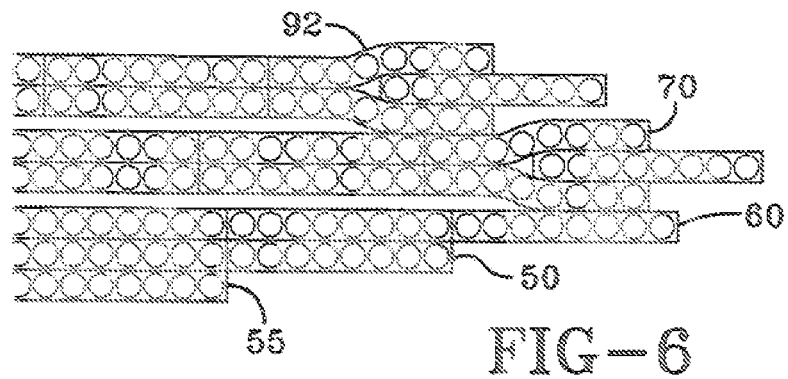
FIG. 6 is a schematically enlarged cross-sectional view of a fourth embodiment of a composite belt package showing the belt layer configuration.
Figure 7:
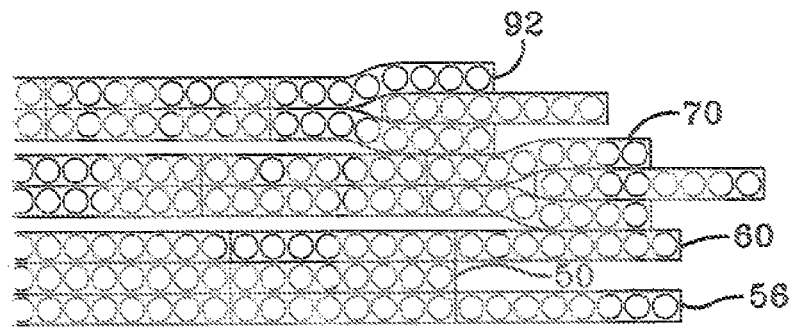
FIG. 7 is a schematically enlarged cross-sectional view of a fifth embodiment of a composite belt package showing the belt layer configuration.

FIG. 6 illustrates an additional embodiment wherein the belt structure further includes a second zigzag belt structure 92 located radially outward of the first zigzag belt structure 70. The second zigzag belt structure 92 has a width less than the first zigzag belt structure 70. The zigzag belt structure 70 is the widest belt, and has a width greater than the width of the belt layer 60. This embodiment further includes 4 low angle belts, 60, 50, 55, 57 wherein the narrowest belt 55 is located radially inward of all the belts, the next widest belt 57 is located radially outward of belt 55, the next widest belt 50 is located radially outward of belt 57, and then the widest belt 60.

Figure 8:
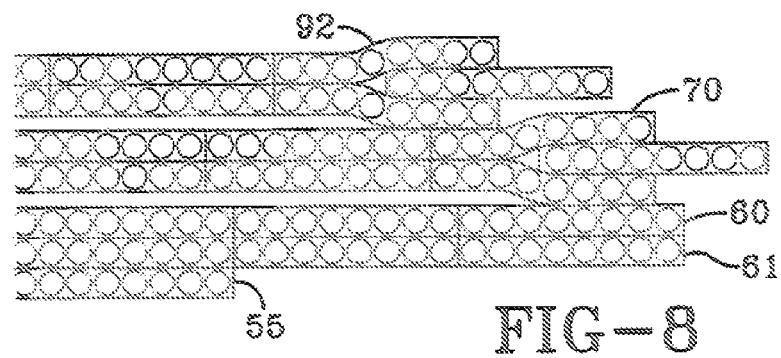
FIG. 8 is a schematically enlarged cross-sectional view of a sixth embodiment of a composite belt package showing the belt layer configuration.

FIG. 8 illustrates yet another embodiment of the invention. The belt package 40 includes two radially outer zigzag belts 92, 70 wherein the zigzag belt 70 is the widest belt of all. The embodiment further includes four low angle belts 52, 54, 56, 58. Two of the low angle belts 56, 58 have the widest width of the low angle belts. The radially outward belt 58 is slightly wider than belt 56. There are also two radially inner low angle belts 52, 54 which have a width of about 25-20% of the width of the belts 56, 58.

Figure 9:
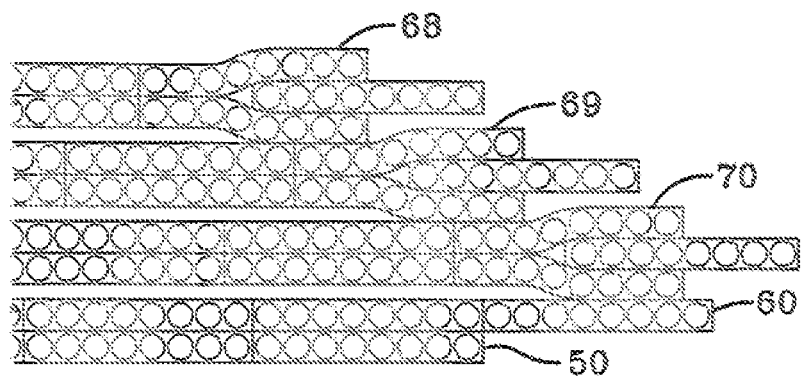
FIG. 9 is a schematically enlarged cross-sectional view of a seventh embodiment of a composite belt package showing the belt layer configuration.
Figure 10:
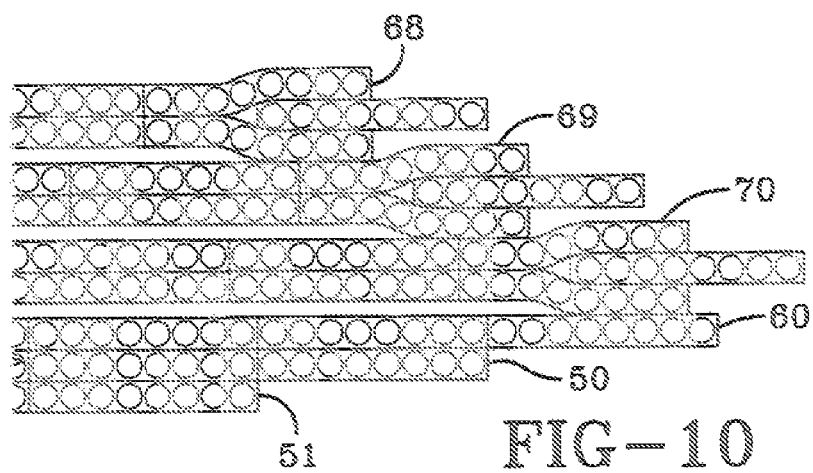
FIG. 10 is a schematically enlarged cross-sectional view of an eighth embodiment of a composite belt package showing the belt layer configuration.

FIG. 9 illustrates still another embodiment of the present invention. The embodiment of FIG. 9 includes two radially inner low angle belts 50, 60. The belt package further includes two additional zigzag belt structures 68, 69 wherein both belt structures are located radially outward of the first zigzag belt structure 70. The belt structures 68, 69, 70 have decreasing belt widths so that the radially innermost belt is the widest belt, and the radially outermost belt 68 is the narrowest. FIG. 10 illustrates a variation of the embodiment of FIG. 9 wherein a third low angle belt 51 is located radially inward of low angle belt 50 and has a width in the range of about 13% to about 47% of the rim width between the flanges.

FIG. 11 illustrates yet another embodiment of the invention. This embodiment includes a first and second belt 100, 105 having of low angle of 5 degrees or less with respect to the circumferential plane. The first and second belts 100, 105 are preferably helically wound. The first belt 100 is the radially innermost belt, and has a width $Bw_s$. The first belt 100 is the narrowest belt of all the belts. The second belt 105 is located radially outward of the first belt, and has a slightly larger width than the first belt. The embodiment further includes a third 110 and fourth belt 115, having a low angle of 5 degrees or less with respect to the circumferential plane. The third and fourth belts are preferably helically wound. The third belt 110 is located radially outward of the second belt, and is substantially wider than the first and second belts. The third belt has a width bw3. The fourth belt 115 is located radially outward of the third belt, and is the widest of the low angle belts. The fourth belt has a width slightly larger than the third belt. The embodiment further includes a first 120 and second 130 zigzag belt structure that are both located radially outward of the first through fourth belts. The first zigzag belt 120 is located radially outward of the fourth belt 115, and has the widest width BwZ of all of the belts. The ratio of the zigzag belt width BWz to the narrowest cut belt Bws is as follows:

$$0.3 < BWs/BWz < 0.6, \text{ and more preferably in the range of } 0.3 < BWs/BWz < 0.5 \tag{1}$$

In the above embodiment, it is additionally preferred that the ply be made of nylon and that the belt be made of an aramid/nylon blend, such that the ply cord % elongation is greater than the belt cord % elongation at break. It is additionally preferred that the maximum belt cord elongation at break be less than 18%.

Near the axially outer ends 122 of the first zigzag belt, a first cut strip 140 is placed between the first zigzag belt end and the fourth belt. A second cut strip 150 is placed between the first and second zigzag belt structures 120, 130. The first cut strip 140 extends axially inward from the axially outer edge of the first zigzag belt a defined width W2. The second strip extends axially inward from the axially outer edge of the second zigzag belt a defined width W1. The defined width W1 and W2 is in the range of 1% to 12% of the width of the widest zigzag belt 120. The thickness of each strip Et is in the range of:

0.5$Cd \leq Et < 3Cd$, wherein Cd is the diameter of the cord of the zigzag belt structure.

The thickness of the strip Et is preferably in the range of:

0.5$Cd \leq Et < 2Cd$

The thickness of the strip Et is more preferably in the range of:

$Cd \leq Et < 2Cd$

FIG. 12 is a close up view of FIG. 11, illustrating the placement of the first and second strips between the fourth belt and the first zigzag belt, and between the first and second zigzag belts.

was significantly decreased to 0.41 and the Et/Cd ratio was 0.3. The tire passed the tread cut test and tire durability slightly improved. In example 6, the Et/Cd ratio was significantly increased to 1.1 and the tire durability significantly increased to 160 from 99 of example 5. Examples 5 and 6 are essentially the same except for the Et/cd ratio. Example 7 is similar to 6, except the Et/Cd ratio was increased to 1.25, which resulted in same durability.

In any of the above described embodiments, the cords are preferably continuously wound from one belt structure to the next.

The cords of any of the above described carcass, spiral or zigzag belt layers described above may be nylon, nylon 6, 6, aramid, or combinations thereof, including merged, hybrid, high energy constructions known to those skilled in the art. One example of a suitable cord construction for the belt cords, carcass cords (or both), may comprise a composite of aramid and nylon, containing two cords of a polyamide (aramid) with construction of 3300 dtex with a 6.7 twist, and one nylon or nylon 6/6 cord having a construction of 1880 dtex, with a 4.5 twist. The overall merged cable twist is 6.7. The composite

TABLE 1

|  | Ex. | | | | | | |
| --- | --- | --- | --- | --- | --- | --- | --- |
|  | 1 | 2 | 3 | 4 | 5 | 6 | 7 |
| Ply | Nylon 1890d/3 | Nylon 1890d/2/2 | Nylon 1890d/3 | Nylon 1890d/3 | Nylon 1890d/3 | Nylon 1890d/3 | Nylon 1890d/3 |
| Belt | Nylon 1890d/3 | Nylon 1890d/2/2 | Nylon 1890d/2/2 | Aramid 3000d/3 | Aramid/Nylon 3000d/2 + 1680d/2 | Aramid/Nylon 3000d/2 + 1680d/3 | Aramid/Nylon 3000d/2 + 1680d/4 |
| Ply cord Elong. % | 22 | 23 | 22 | 22 | 22 | 22 | 22 |
| Belt cord % elong. | 25 | 23 | 25 | 25 | 14 | 14 | 14 |
| BWs/BWZ | .63 | .63 | .63 | .63 | .41 | .41 | .41 |
| Et/Cd | 0.25 | 0.26 | 0.26 | 0.30 | 0.30 | 1.10 | 1.25 |
| Belt ends per in | 22 | 20 | 20 | 18 | 18 | 18 | 18 |
| Tread cut test | Blew | Blew | Blew | Pass | Pass | Pass | Pass |
| Tire durability index | 100 | 103 | 105 | 98 | 99 | 160 | 160 |
| Weight index | 100 | 97 | 98 | 86 | 86 | 86 | 87 |

The first cut strip 140 may also be placed between belts 60 and 70 of FIGS. 3 through 10 in the manner as described above. The second cut strip may also be placed between belts 70 and 90 of FIG. 5, and belts 70 and 92 of FIGS. 6-8, and between belts 69 and 70 of FIGS. 9 and 10.

In the table I above, a series of tires having size 46×17.0R20 30PR were made. The tires were tested at the following conditions: Rated load: 46000 lbs, Rated pressure: 222 psi, 40 mph speed. Durability test condition: FAA TSO C62e. Tread cut test condition: dropping metal blade between tire and drum during rotating tire under rated condition.

Three tires labeled as 1-3, were made from nylon ply and nylon belts. All three tires had a BWs/BWz of 0.63 and a Et/Cd ratio in the range of 0.25-0.26. All three examples failed the tread cut test, although tire durability index ranged from 100 to 105. The weight index ranged from 100 to 97. Tire example 4 had the same characteristics as the other three examples, except that the belt was made of aramid, and the Et/Cd ratio was increased to 0.3. The tire passed the tread cut, but the durability index decreased to 98. The weight index was significantly decreased to 86. In example 5, the belt was made of an aramid/nylon cord, the belt width ratio BWs/BWz cords may have an elongation at break greater than 11% and a tensile strength greater than 900 newtons. Optionally, the original linear density may be greater than 8500 dtex. Elongation, break, linear density and tensile strength are determined from cord samples taken after being dipped but prior to vulcanization of the tire.

Variations of the present invention are possible in light of the description as provided herein. While certain representative embodiments and details have been shown for the purpose of illustrating the subject inventions, it will be apparent to those skilled in the art that various changes and modifications can be made without departing from the scope of the subject inventions.

What is claimed is:

1. A pneumatic tire having a carcass and a belt reinforcing structure, the belt reinforcing structure comprising:
    a first belt layer having cords arranged at an angle of 5 degrees or less with respect to the midcircumferential plane, and a zigzag belt reinforcing structure, the zigzag belt reinforcing structure forming two layers of cords, the cords inclined at 5 to 30 degrees relative to the centerplane of the tire extending in alternation to turnaround points at each lateral edge, wherein the zigzag belt reinforcing structure is wider than the first belt layer and is located radially outward of the first belt layer, wherein there is a first cut belt located between a first axially outer edge of the first belt layer and the zigzag belt layer in the radial direction, and there is a second cut belt located between a second axially outer edge of the first belt layer and the zigzag belt layer in the radial direction, wherein the first and second cut belts do not extend under a crown of the tire, wherein the belt reinforcing structure further comprises a third belt layer located radially inward of the first and second belt layers, wherein the third belt layer has a width less than the first belt layer and a width less than the second belt layer.

2. The pneumatic tire of claim 1 wherein the width of the cut belt layer is in the range of 1% to 12% of the zigzag belt structure width, as measured from the axially outer position of the zigzag belt structure.

3. The pneumatic tire of claim 1 wherein the cut belt layer has a thickness Et greater than or equal to ½ Cd, wherein Cd is the cord diameter of the zigzag belt structure.

4. The pneumatic tire of claim 1 wherein the cut belt layer has a thickness Et less than 3 Cd, wherein Cd is the cord diameter of the zigzag belt structure.

5. The pneumatic tire of claim 1 wherein the cut belt layer has a thickness Et greater than or equal to ¾ Cd, wherein Cd is the cord diameter of the zigzag belt structure.

6. The pneumatic tire of claim 1 wherein the cut belt layer has a thickness Et less than 2 Cd, wherein Cd is the cord diameter of the zigzag belt structure.

7. The pneumatic tire of claim 1 wherein the width of the cut belt layer is in the range of 3% to 11% of the zigzag belt structure width, as measured from the axially outer position of the zigzag belt structure.

8. The pneumatic tire of claim 1 wherein the first belt layer or the zigzag belt structure has cords having a percent elongation at break less than 18% when measured on a cured tire, and a break strength greater than about 900 N when measured on a cured tire.

9. The pneumatic tire of claim 1 wherein the first belt layer or the zigzag belt structure has cord endings having greater than 15 cords per 1 inch length.

10. The pneumatic tire of claim 1 wherein the first belt layer or the zigzag belt structure has cords made of aramid and nylon fibers.

11. The pneumatic tire of claim 1 wherein the first belt layer is formed from helically winding the cords forming a spiral layer.

12. The pneumatic tire of claim 1 wherein the ratio of the zigzag belt width Wz to the widest belt layer width Ws is in the range of about: 0.6<Ws/Wz<1.

13. The pneumatic tire of claim 1 wherein one or more of the belts comprise cords made of a nylon and aramid blend.

14. The pneumatic tire of claim 1 wherein one or more of the belts comprise cords made of aramid.

15. The pneumatic tire of claim 1 wherein at least one belt ply layer has cords having a percent elongation at break greater than about 11%, and a break strength greater than about 900N with an original linear density of greater than about 8500 dtex.

16. A pneumatic tire having a carcass and a belt reinforcing structure, the belt reinforcing structure comprising:
a first belt layer having cords arranged at an angle of 5 degrees or less with respect to the midcircumferential plane, and a zigzag belt reinforcing structure, the zigzag belt reinforcing structure forming two layers of cords, the cords inclined at 5 to 30 degrees relative to the centerplane of the tire extending in alternation to turn-around points at each lateral edge, wherein the zigzag belt reinforcing structure is wider than the first belt layer and is located radially outward of the first belt layer, wherein there is a first cut belt located between a first axially outer edge of the first belt layer and the zigzag belt layer in the radial direction, and there is a second cut belt located between a second axially outer edge of the first belt layer and the zigzag belt layer in the radial direction, wherein the first and second cut belts do not extend under a crown of the tire, wherein the belt structure further comprises: two radially inner spiral belt layers, two zigzag belt structures and two radially outer spiral belt layers.

17. A pneumatic tire having a carcass and a belt reinforcing structure, the belt reinforcing structure comprising:
a first belt layer having cords arranged at an angle of 5 degrees or less with respect to the midcircumferential plane,
and a first and second zigzag belt reinforcing structure, the zigzag belt reinforcing structure forming two layers of cords, the cords inclined at 5 to 30 degrees relative to the centerplane of the tire extending in alternation to turn-around points at each lateral edge, wherein the first and second zigzag belt reinforcing structure are each located radially outward of the first belt layer, wherein there is a first cut belt located between a first axially outer edge of the first belt layer and the first zigzag belt reinforcing structure, and a second cut belt located between a second axially outer edge of the first belt layer and the first zigzag belt reinforcing structure, wherein there is a third cut belt located between the first zigzag belt structure and a first axially outer end of the second zigzag belt structure, wherein there is a fourth cut belt located between the first zigzag belt structure and a second axially outer end of the second zigzag belt structure, wherein each of the first, second, third and fourth cut belts do not extend under a crown of the tire.

18. The pneumatic tire of claim 17 wherein the width of the first cut belt layer is in the range of 1% to 12% of the zigzag belt structure width, as measured from the axially outer position of the zigzag belt structure.

19. The pneumatic tire of claim 17 wherein the first cut belt layer has a thickness Et greater than or equal to ½ Cd, and has a thickness Et less than 3 Cd, wherein Cd is the cord diameter of the zigzag belt structure.

20. The pneumatic tire of claim 17 wherein the first cut belt layer has a thickness Et greater than or equal to ¾ Cd and less than 2 Cd, wherein Cd is the cord diameter of the zigzag belt structure.

21. The pneumatic tire of claim 17 wherein the width of the first cut belt layer is in the range of 3% to 11% of the zigzag belt structure width, as measured from the axially outer position of the zigzag belt structure.

22. The pneumatic tire of claim 17 wherein the second cut belt layer has a thickness Et greater than or equal to ½ Cd, and has a thickness Et less than 3 Cd, wherein Cd is the cord diameter of the zigzag belt structure.

23. The pneumatic tire of claim 17 wherein the second cut belt layer has a thickness Et greater than or equal to ¾ Cd and less than 2 Cd, wherein Cd is the cord diameter of the zigzag belt structure.

24. The pneumatic tire of claim 17 wherein the width of the second cut belt layer is in the range of 3% to 11% of the zigzag belt structure width, as measured from the axially outer position of the zigzag belt structure.

* * * * *